Patented June 22, 1926.

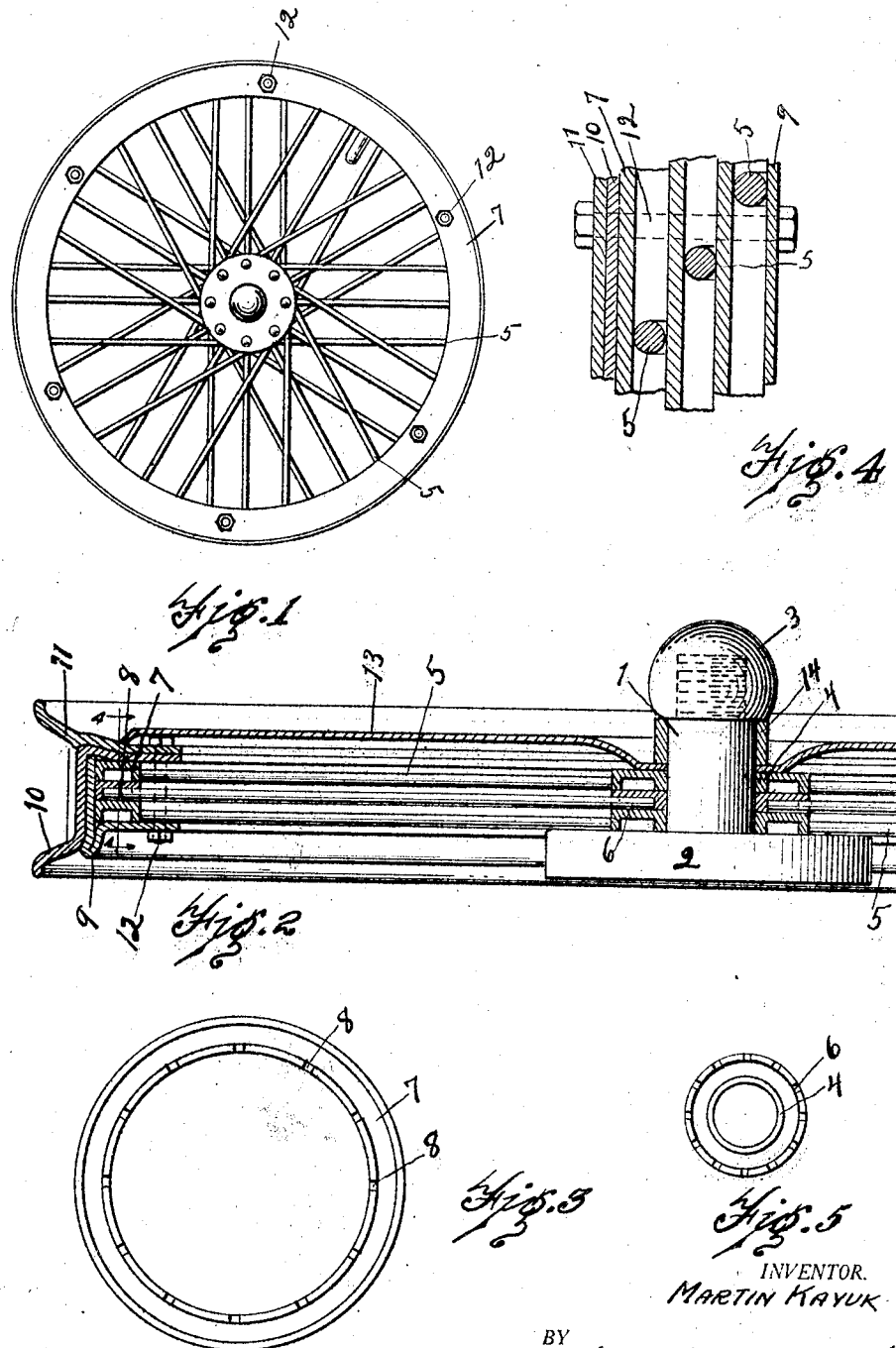

1,589,806

UNITED STATES PATENT OFFICE.

MARTIN KAYUK, OF DETROIT, MICHIGAN.

AUTOMOBILE WHEEL.

Application filed February 3, 1926. Serial No. 85,713.

My invention relates to automobile wheels and has for its object to provide a wire wheel which may be changed at will to simulate a disc wheel. This object is accomplished by the means illustrated in the accompanying drawings and hereinafter described.

Referring now to the drawings:

Fig. 1 is a plan view of my wheel without the demountable rim.

Fig. 2 is a section of my wheel through the hub and showing the addition of a demountable rim thereto, and a section of the disc illustrating the manner of applying my disc to the wheel.

Fig. 3 is a plan view of the inner rim member to hold the outer ends of the spokes.

Fig. 4 is a section on line 4—4 of Fig. 2.

Fig. 5 is the hub member to which are secured the inner ends of the spokes.

In the accompanying drawings reference numerals are employed to indicate the several parts. A hub 1, has secured to a brake-drum 2 which is of the type commonly employed in automobiles and need not be more fully described. A sleeve 4 is mounted on the hub and is provided with a series of slots 6 to receive the inner ends of the spokes 5. An inner rim 7 is provided with slots 8 adapted to receive the outer ends of the spokes. The inner rim 7 is fitted into the ring 9 secured within the rim 10. A demountable rim member 11 co-operates with the rim member 10 to complete the tire-holding rim. The ring 9, the inner rim 7, the rim member 10 and demountable rim member 11, are all secured together by the bolts 12.

When thus constructed we have a wire wheel. Now if it is desired to make the wheel appear to be a disc wheel, a disc 13 is mounted on the hub 1. A sleeve 14 secures the disc to the wheel by being forced against the wheel by the threaded hub-cap 3. When the disc is removed, the same sleeve 14 is forced against the sleeve 4 by the hub-cap 3. It is readily seen that the disc may be attached to or detached from the wheel whenever desired and the wheel may be used with or without the disc.

Having fully described my invention, what I claim is:

An automobile wheel comprising a member sleeved upon the hub and adapted to receive and hold the inner ends of the spokes of the wheel, an inner rim member adapted to receive and hold the outer ends of the spokes of the wheel, a ring adapted to receive within it said inner rim member, an outer rim member, a demountable rim member, and means for securing said inner rim, said ring, outer rim member and demountable rim member together.

Signed at the city of Detroit, county of Wayne, State of Michigan, this 29th day of January, 1926.

MARTIN KAYUK.